United States Patent [19]

Oliver et al.

[11] Patent Number: 5,780,957
[45] Date of Patent: Jul. 14, 1998

[54] MOVING LINEAR PIEZOELECTRIC MOTOR FOR VEHICLE APPLICATIONS

[75] Inventors: John R. Oliver, Newbury Park; Ratnakar R. Neurgaonkar; Jeffrey G. Nelson, both of Thousand Oaks, all of Calif.; Carlo Bertolini, Feucherolles, France

[73] Assignee: Meritor Light Vehicle Systems, Inc., Troy, Mich.

[21] Appl. No.: 747,138

[22] Filed: Nov. 12, 1996

[51] Int. Cl.[6] ............................................. H01L 41/08
[52] U.S. Cl. ............................................................ 310/328
[58] Field of Search .................................... 310/328, 366

[56] References Cited

U.S. PATENT DOCUMENTS

| | | | |
|---|---|---|---|
| 3,296,467 | 1/1967 | Locher | 310/328 |
| 3,902,085 | 8/1975 | Bizzigotti | 310/328 |
| 4,219,755 | 8/1980 | O'Neill et al. | 310/328 |
| 4,408,832 | 10/1983 | Hartman et al. | 310/328 X |
| 4,622,483 | 11/1986 | Staufenberg, Jr. et al. | 310/328 |
| 4,727,278 | 2/1988 | Staufenberg, Jr. et al. | 310/328 |
| 4,736,131 | 4/1988 | Fujimoto | 310/328 |
| 4,777,398 | 10/1988 | Shibuya | 310/328 |
| 4,990,835 | 2/1991 | Ohnishi et al. | 310/116 |
| 5,563,465 | 10/1996 | Nakahara et al. | 310/328 |

*Primary Examiner*—Mark O. Budd

[57] ABSTRACT

A piezoelectric moving linear motor consists of three piezoelectric actuators which are controlled relative to each other. One piezoelectric actuators causes two blocks to move away from each other in opposition to a spring force. The other two piezoelectric actuators selectively clamp a block to a guide shaft. By cyclically controlling the actuation of the three piezoelectric actuators, the motor is able to move the blocks axially along the guide shaft. Preferably, a vehicle component such as a window is fixed to one block and is caused to move along the guide shaft.

10 Claims, 3 Drawing Sheets

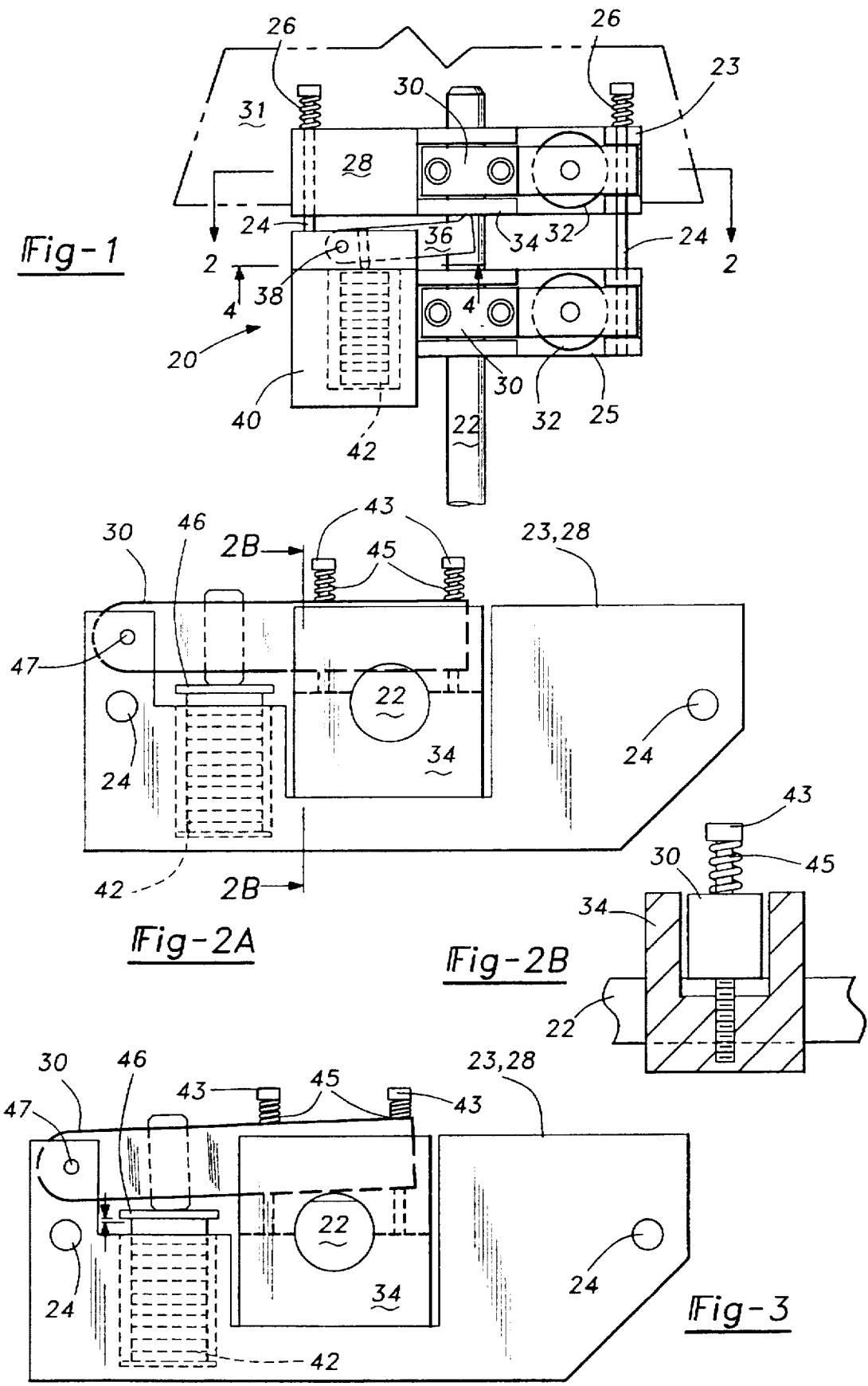

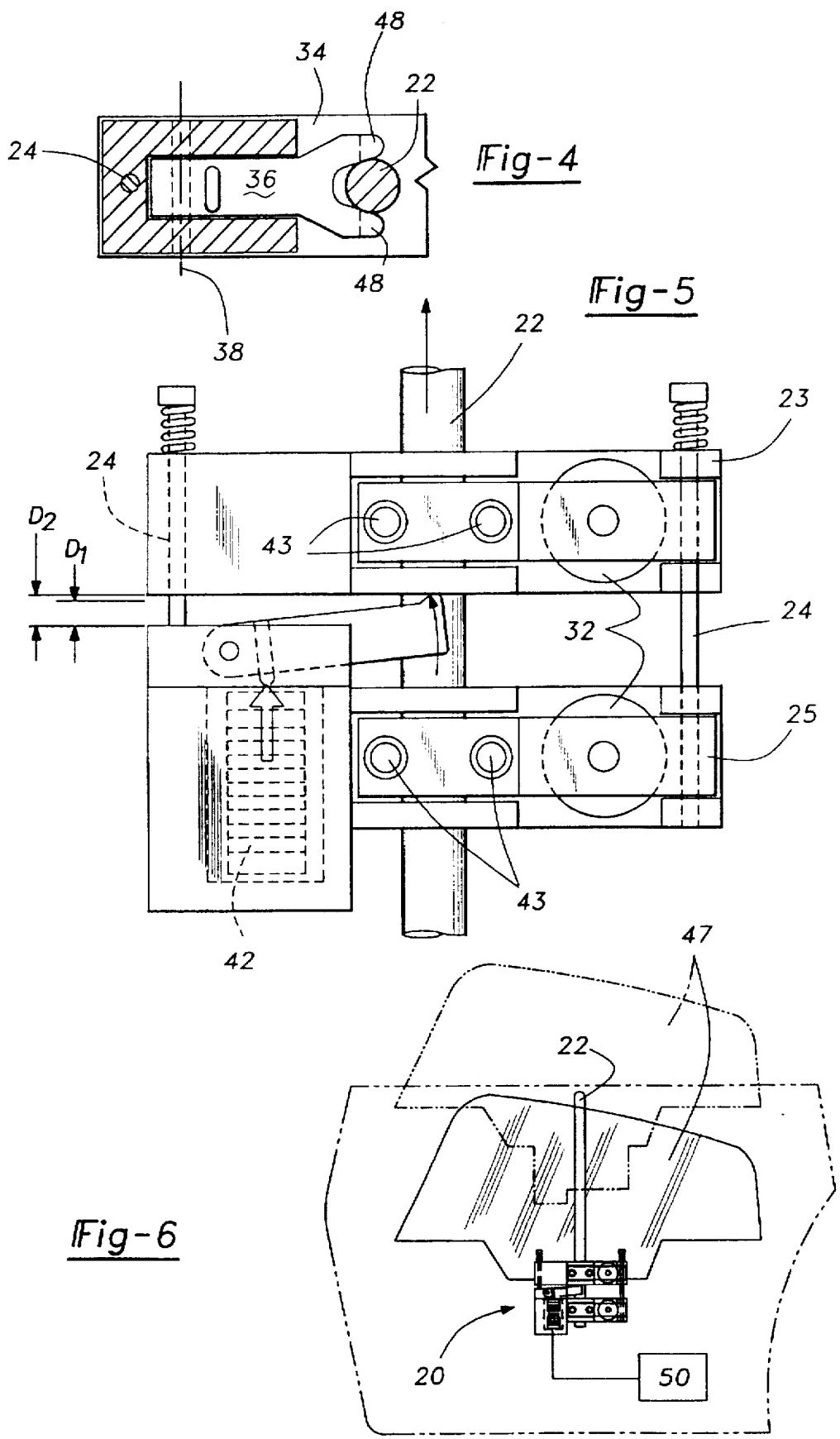

MOVING LINEAR PIEZOELECTRIC MOTOR FOR VEHICLE APPLICATIONS

BACKGROUND OF THE INVENTION

This application relates to a moving linear piezoelectric motor. In preferred applications, the motor is utilized to drive a vehicle component.

In the prior art, piezoelectric multilayer stack actuators are utilized in many applications to provide a motor. Piezoelectric actuators of this type are generally formed from specific materials that can expand or contract in response to electrical charges. The expansion and contraction occurs quite rapidly, and with proper control, piezoelectric actuators can be utilized to move other members. Generally, piezoelectric actuators have not been utilized to transmit heavy elements that require high torque.

Vehicle components have typically utilized rotary electric motors to drive their components. The rotary motors are sometimes connected through transmissions which change the rotary movement into linear movement. Examples of the type of vehicle components routinely driven by electric motors are window lift motors, sunroof lift motors, door lock mechanisms, seat position drives, and any other moving elements. The electric motors and gear boxes typically utilized for vehicle applications have been somewhat bulky and expensive.

Piezoelectric motors can be relatively small compared to electric motors. In addition, piezoelectric motors can be relatively inexpensive. However, piezoelectric motors have not been utilized to drive vehicle components in the past. Again, piezoelectric actuators have typically been utilized to drive low-torque requiring applications.

SUMMARY OF THE INVENTION

In a disclosed embodiment of this invention, piezoelectric actuators are utilized to provide a moving linear motor for moving a component between spaced positions. In a preferred application, the component is a vehicle component, and most preferably a vehicle window.

In a preferred embodiment, three piezoelectric actuators are utilized and controlled in combination to achieve the linear motor. A first block is spaced from a second block. A piezoelectric actuator is associated with each of the blocks and is operable to move a clamping finger towards and away from a guide shaft. The two blocks move along the guide shaft. One of the two blocks is fixed to the component. That is, if a window is being lifted by this motor, the window is fixed to move with one of the two blocks.

The two blocks are spaced by a small axial distance. Pins extend through one of the blocks, and are fixed to the other block. A spring biases the pin, and the block fixed to the pin, toward the other block. A displacement piezoelectric actuator is associated with one of the two blocks, and drives a push lever toward and away from the other block.

To achieve the inventive linear movement, a first of the two blocks has its clamp finger clamped on the guide shaft. The other block has its clamp finger moved to the unclamped position. The clamp finger moves to the unclamped position by expanding or contracting an associated piezoelectric actuator. After one of the blocks is clamped and the other block is unclamped, the displacement piezoelectric actuator drives the lever such that it forces the unclamped block away from the clamped block. The clamped block is fixed on the guide shaft and does not move. The lever pivots relative to the blocks, and the unclamped block moves axially along the guide shaft by a small amount. The lever creates a mechanical advantage providing more movement of the unclamped block than would be otherwise achieved by the expansion of the piezoelectric actuator. The same is true for the clamp finger movement. Preferably, the lever has arms spaced on both sides of the guide shaft which force the block along the guide shaft. By placing the arms on opposed sides of the guide shaft, any torque about the guide shaft is negated. In this way, the inventive motor achieves smooth and reliable movement.

Once the unclamped block has moved, its clamp is closed. The clamp associated with the previously clamped block is then unclamped. The displacement piezoelectric actuator is then de-energized or relaxed. A spring bias on the pins then draws the now unclamped block toward the now clamped block. In this way, the two blocks rapidly move in small increments along the guide shaft. Since the vehicle component is fixed to one of the blocks, the vehicle component also moves along the guide shaft.

In preferred embodiments of this invention, the basic motor is utilized either singularly, or in pairs to drive a window. If the motor is utilized in pairs, the relative movement of the two motors on spaced guide shafts can be controlled to operate at different speeds such that the window may move into its associated seat in the door frame from a variety of angular orientations. This facilitates the soft and safe movement of the window into its seat.

The linear motor is smaller than the prior art motors. Moreover, since the motor achieves direct linear movement, no rotary-to-linear transmission is needed.

These and other features of the present invention can be best understood from the following specification and drawings, of which the following is a brief description.

BRIEF DESCRIPTION OF THE DRAWINGS

FIG. 1 is a side view of a piezoelectric motor according to this invention.

FIG. 2A is a cross-sectional view along line 2—2 as shown in FIG. 1, showing one block of the present invention in an unclamped position.

FIG. 2B shows an end view of the structure shown in FIG. 2A.

FIG. 3 shows the clamp portion of the block shown in FIG. 2 in its clamped position.

FIG. 4 shows a cross-sectional view along line 4—4 as shown in FIG. 1.

FIG. 5 shows a step in the movement of the present invention.

FIG. 6 shows a first embodiment for driving a window.

DETAILED DESCRIPTION OF A PREFERRED EMBODIMENT

Figure 7:
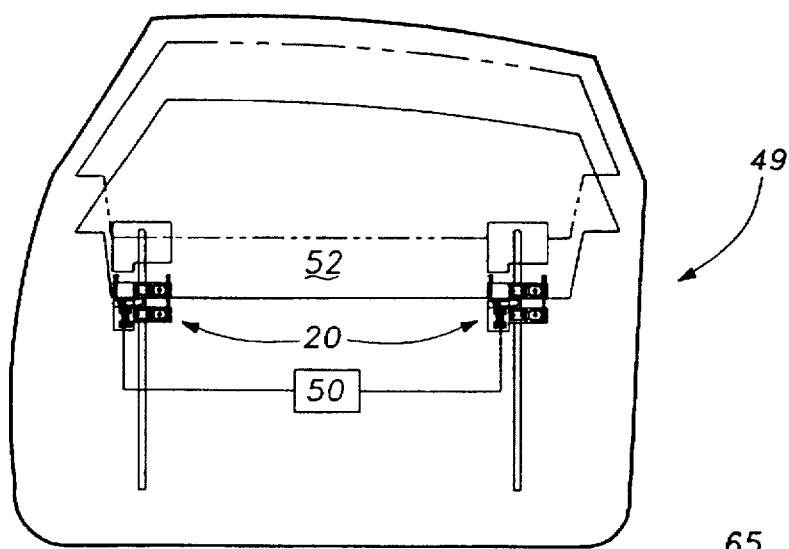
FIG. 7 shows an alternative arrangement.

FIG. 1 shows a system 20 that provides a linear motor for movement along a shaft 22. A first block 23 has pins 24 extending through the block, which are then fixed to a second block 25 at 27. Springs 26 are received on pins 24 and bias the pin 24 and the block 25 toward the block 23.

The blocks 23 and 25 are similar, and each include a lower fixed portion 28 and clamping arm portion 30. A component, here a window 31, is fixed to one block, here block 23. The clamping arm portions 30 are movable under the influence of a multilayer stack piezoelectric actuator 32, which can expand or contract to move the clamp 30 between clamped and unclamped positions on the guide shaft 22. A worker in the piezoelectric motor art would know how to achieve such movement with the application of appropriate voltages. Fixed portion 34 is a guide bushing provided about the guide shaft 22 and spaced from the clamp portion 30. A lever 36 pivots on a pin 38 in a displacement element 40 which is fixed to the lower portion 28 (not shown) of block 23. A piezoelectric actuator 42 expands or contracts to drive the lever 36 to pivot about the point 38 through a transmission element 44.

In the position shown in FIG. 1, the blocks 23 and 25 are not spaced by any influence of the lever 36. Instead, the piezoelectric element 42 has been de-energized or moved to its contracted or relaxed position. The force of springs 26 has caused the pin 24 and block 25 to be moved toward the block 23. The two blocks are spaced by the distance $D_1$.

As shown in FIG. 2A, the clamping portion 30 includes a finger 44 spaced on one side of the guide shaft 22 from guide bushing 34. The piezoelectric actuator 32 expands or contracts to move finger 44 from the open unclamped position as shown in FIG. 2A to a closed clamped position such as shown in FIG. 3.

As shown, pins 43 connect finger 44 to block 34. Springs 45 bias finger 44 toward the FIG. 3 position. In the position shown in FIG. 2A, the piezoelectric actuator 32 is expanded, thus causing finger 44 to pivot about point 47, and away from the guideshaft 22 against the force of spring 45. Set screw 46 provides the actual contact between the piezoelectric actuator 32 and the clamp finger 44. Set screw 46 can be adjusted to adjust the amount of movement of the finger 44 based on the expansion of the actuator 32. By utilizing the pivot mount 47, the finger 44 achieves a mechanical advantage at the location of shaft 22. That is, the actuator 32 need only move a relatively small amount, and the finger 44 will move a greater amount. This will insure good clamping force even if there are some slight manufacturing tolerances resulting in an unexpectedly large amount of clearance between the finger 44 and the shaft 22. In the FIG. 3 position, the piezoelectric actuator 32 has moved to its contracted or de-energized position, and the spring force 45 now forces the finger 44 onto guideshaft 42 to provide the clamped position.

Note, shaft 22 is shown to have a truncated upper surface. This will prevent the blocks from rotating on the shaft 22. In certain applications, it may not be necessary to have the truncated surface, and yet the motor will still not rotate relative to the shaft. As an example, if the blocks are attached to a window, the mount to the window will prevent any rotation relative to the shaft. Other shaft shapes are within the scope of this invention.

As shown in FIG. 2B, the clamp arm 30 is biased toward the shaft 22 by the spring 45. The guide bushing 34 includes a opening at a central location to receive the clamp arm 30 and allow access to the shaft 22.

It should be understood the details illustrated in FIGS. 2A and 2B are exemplary, and other arrangements for clamping on the guide shaft 22 may be utilized. Further, while the invention is shown here with the actuated position of the piezoelectric actuator 32 resulting in the unclamped position, it should be understood that an alternative arrangement could be provided in which the finger is moved to the locked position when actuator 32 is actuated. The embodiment shown in FIG. 2A, 2B and 3 wherein the de-energized position is clamped is preferred, as this will result in clamping when the system is shut down, thus locking the window.

FIG. 4 shows a detail of the lever 36, which has arms 48 formed on each side of the guide shaft 22, and associated with corresponding surfaces on the guide surface 34 of the fixed portion 28.

As shown in FIG. 4, since the arms 48 are spaced on each side of the guide shaft 22, any torque about the shaft center line will be negated. The lever provides mechanical amplification of the amount of expansion of displacement actuator 42. This allows a substantially lower operating frequency than what would be otherwise required to achieve practical window movement rates.

The movement of an element with motor 20 will now be described with reference to FIGS. 5 and 1. As shown in FIG. 5, the motor has now caused upward movement. Block 25 has its clamp 30 clamped on the guide shaft 22, such as shown in FIG. 3. Block 23 has its clamp 30 moved to the unclamped position as shown in FIG. 2A. The piezoelectric actuator 42 is expanded to drive the lever 36 to pivot upwardly as shown in FIG. 5. This movement forces block 23 along guide shaft 22. The movement spaces the blocks 23 and 25 by a distance $D_2$, which is greater than the distance $D_1$ as shown in FIG. 1.

Once an incremental amount of movement has been achieved by this step, the clamp 30 associated with block 23 is moved to the clamped position as shown in FIG. 3. Block 25 has its clamp portion 30 moved to the unclamped portion as shown in FIG. 2A, and the piezoelectric actuator 42 is moved to its relaxed position. At that point, springs 26, which have been compressed by movement of block 23, move to a relaxed position by forcing pins 24 and block 25 upwardly. The motor now returns to the position shown in FIG. 1, where blocks 23 and 25 ar spaced by a distance $D_1$. The method is then repeated on a quick cycle. By quickly repeating these two steps, the motor moves incrementally and smoothly along the shaft 22. By controlling the operation of piezoelectric actuators 32 and 42, the overall movement of the combined blocks is very smooth, and is effectively continuous.

The force capability of the motor is determined by the frictional force of the individual clamps 30, and by the force capability and mechanical stiffness of the piezoelectric actuator 42 and the lever mechanism. This force capability is proportionally reduced by the mechanical amplification caused by the lever. The mechanical stiffness of the displacement mechanism is also reduced by the square of the amplification effect. Thus, the amount of amplification of the lever arm is limited by other design features. Even so, force capabilities ranging up to several hundred pounds are easily obtainable with this motor design.

The motor speed is governed by the operating frequency and the amount of motion achieved on each cycle. Actuator heating due to dielectric losses in the piezoelectric actuator material increases with operating frequency. Thus, continuous operation of the motor would require a typical operating frequency of below 1–2 kHz depending on the overall size and geometry of the piezoelectric actuators used. For a one inch long piezoelectric displacement actuator 42 having a .002" nominal stroke (i.e.,0.2% strain) amplified by a 5:1 ratio lever arm, the motor speed at 500 Hz operation is 5 inches per second. Operation below 1 kHz also reduces the radiated acoustic noise by the motor. The stroke amplification is a unique feature of this motor which permits high speed operation without the use of excessively large piezoelectric actuators or excessively high operating frequencies.

To operate the motor in a reverse direction, clamp 30 associated with block 23 is locked. The clamp 30 associated with block 25 is open. The piezoelectric element 42 is moved to its expanded position such that the lever 36 pivots about point 38. Since block 23 is fixed to guide shaft 22, block 25 is forced downwardly as shown in FIG. 5. Once an incremental amount of movement has been achieved, clamp 30 associated with block 25 is moved to its clamped position. The clamp 30 associated with block 23 is moved to its unclamped position and piezoelectric element 42 is moved to its contracted position. At this time, the spring force from the compressed springs 26 causes block 23 to move downwardly such that the two blocks return to the position as shown in FIG. 1. Again, by rapidly repeating these two steps, the present invention is able to achieve smooth movement of the blocks. Note that motor reversal is virtually instantaneous, since it involved only the electrical reversal of the timing sequence for the two actuators.

FIG. 6 shows an embodiment 49 wherein a single motor 20 is mounted on a single shaft 22 to drive a window 47 upwardly. A motor control 50 controls the motor to achieve the desired movement.

FIG. 7 shows an alternative embodiment 49. A control 50 controls movement of a window 52 through two linear motors 20, as disclosed above. One block from each motor is fixed to move with the window 52 such that as the motors move incrementally along the guide shaft 22, the window 52 also moves.

Figure 8:
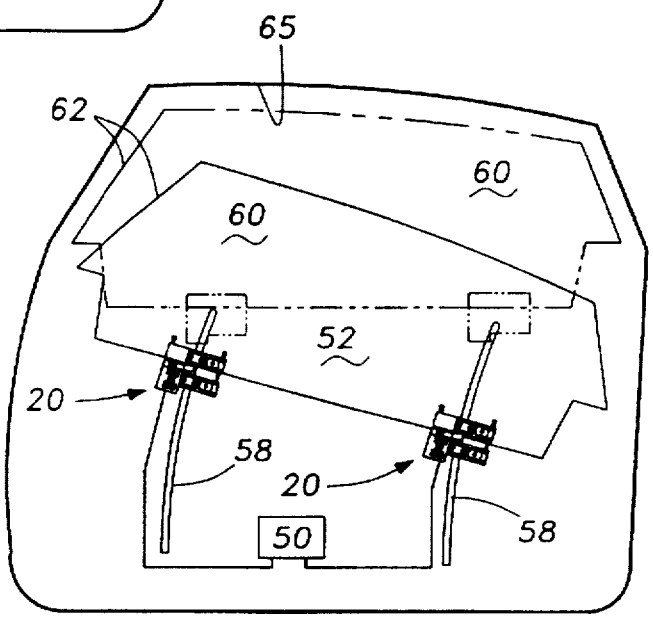
FIG. 8 shows yet another alternative arrangement.

FIG. 8 shows another embodiment 56 having two guide shafts 58 which are somewhat curved. In this application, the window 60 is driven towards a position 62 where a forward end 64 initially contacts the door frame 65. By controlling the speed of the two motors 20 such that the leftwardmost motor in FIG. 8 is driven more rapidly initially, this movement can be achieved. With this movement, the window can be brought into smooth and safe abutment with its seat in the door frame 65. This is especially beneficial for windows having relatively complex configurations.

Figure 9:
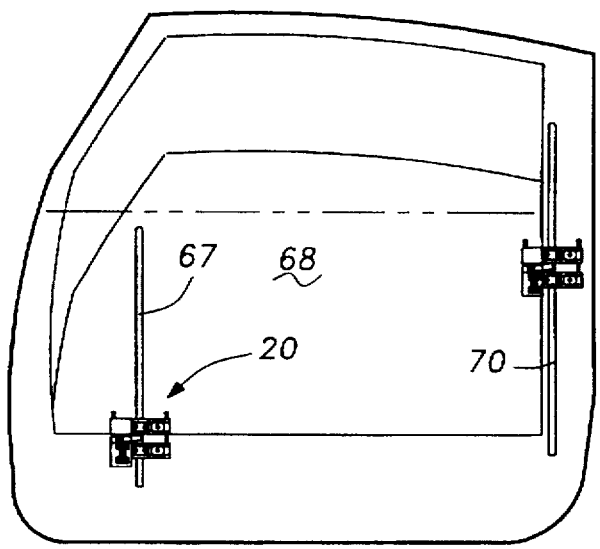
FIG. 9 shows one other embodiment.

FIG. 9 shows another embodiment 66 wherein one guide shaft 67 is provided beneath the window 68 and a second guide shaft 70 is provided on the side. Of course, motors 20 can be provided at any of several locations on the window including the side or bottom. In addition, while there may be two guide shafts, it may be possible to only utilize a single motor, with the second guide shaft receiving a slide bearing arrangement to provide guidance only.

Preferred embodiments of this invention have been disclosed, however, a worker of ordinary skill in the art would recognize certain modifications come within the scope of this invention. For that reason, the following claims should be considered to determine the true scope and concept of this invention.

We claim:

1. A vehicle component drive system comprising:

a vehicle component movable between two linearly spaced positions;

a drive for moving said component including a piezoelectric motor for causing said movement between said two linearly spaced positions, said motor including structure for alternately clamping and releasing portions of said motor to said component, and a spring for biasing and moving said component in conjunction with said clamping and releasing; said said piezoelectric motor including at least two piezoelectric actuators causing linear movement which is then transmitted to said vehicle component, said piezoelectric motor includes two-spaced blocks each having an associated one of said piezoelectric actuators, said blocks being movable along a guide shaft, said vehicle component being fixed to move with one of said blocks, and said blocks being selectively actuatable to move between positions where they are clamped on said guide shaft, and where they are unclamped on said guide shaft such that said blocks move axially along said guide shaft, a third piezoelectric actuator associated with said motor and actuatable between expanded and contracted positions to force one of the blocks axially along said guide shaft, and at least one pin fixed to one of said blocks and movable relative to the other of said blocks and a spring positioned on said pin for biasing said two blocks together.

2. A system as recited in claim 1, wherein the displacement of said third piezoelectric actuator is amplified in movement of said block.

3. A system as recited in claim 2, wherein said third piezoelectric actuator forces a lever to pivot on a pivot point and force said one block axially along said guide shaft.

4. A system as recited in claim 3, wherein said first and second piezoelectric actuators associated with said blocks move at least one finger to pivot between clamped and unclasped positions on said guide shaft.

5. A system as recited in claim 1, wherein said vehicle component is a vehicle window.

6. A piezoelectric element as recited in claim 5, wherein said vehicle component includes two of said piezoelectric motors for driving said window.

7. A piezoelectric motor comprising:

a guide shaft for guiding movement;

a first and second block slidably received on said guide shaft, each of said blocks being provided with an associated piezoelectric actuator actuatable to move between clamped and unclamped positions on said guide shaft, said blocks being movable along said guide shaft when said piezoelectric actuator is in said unclamped position;

a spring bias normally biasing said first and second blocks together;

a third piezoelectric actuator for forcing said two blocks away from each other;

expansion of said third piezoelectric actuator being amplified when transmitted to one of said blocks, and said amplification occurring from a lever, said lever being connected to said third piezoelectric actuator to pivot upon expansion of said third piezoelectric actuator and force one of said blocks away from the other of said blocks; and a pin being fixed in one of said blocks and the other of said blocks being moveable relative to said pin, said spring bias provided by a coil spring received on said pin.

8. A motor as recited in claim 7, wherein each of said blocks include at least one clamp finger selectively clamped on said guide shaft when its associated piezoelectric actuator is moved to said clamped position and move away from said guide shaft when its associated piezoelectric actuator is in said unclamped position.

9. A piezoelectric motor comprising:

a guide shaft for guiding movement;

a first and second block slidably received on said guide shaft, each of said blocks being provided with an associated piezoelectric actuator actuatable to move between clamped and unclamped positions on said guide shaft, said blocks being movable along said guide shaft when said piezoelectric actuator is in said unclamped position;

a spring bias normally biasing said first and second blocks together;

a third piezoelectric actuator for forcing said two blocks away from each other;

expansion of said third piezoelectric actuator being amplified when transmitted to one of said blocks, and said amplification occurring from a lever, said lever being connected to said third piezoelectric actuator to pivot upon expansion of said third piezoelectric actuator and force one of said blocks away from the other of said blocks;

a pin being fixed in one of said blocks and other of said blocks being moveable relative to said pin, said spring bias provided by a coil spring received on said pin; and said pin being fixed to one of said blocks and moveable relative to the other of said blocks, said spring being received on a portion of said pin which extends to the other of said blocks and on an opposed side of said other block relative to said one block.

10. A motor as recited in claim 7, wherein said motor drives a vehicle window.

* * * * *

UNITED STATES PATENT AND TRADEMARK OFFICE
CERTIFICATE OF CORRECTION

PATENT NO. : 5,780,957

DATED : July 14, 1998

INVENTOR(S) : John R. Oliver, et al

It is certified that error appears in the above-identified patent and that said Letters Patent is hereby corrected as shown below:

Title page item [56], insert the following--

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 0 | 8 | 7 | 8 | 5 | 1 | 02/11/1992 | Nakazawa et al. | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | EP | 0 | 7 | 12 | 17 | 0 | A1 | 05/15/1996 | Europe | | | |
| | | D | E | 19 | 60 | 74 | 17 | A1 | 09/04/1997 | Germany | | | |
| | | 6 | 3 | 0 | 41 | 4 | 6 | 3 | 02/24/1988 | Europe | | | |
| | | | | | | | | | | | | | |

UNITED STATES PATENT AND TRADEMARK OFFICE
CERTIFICATE OF CORRECTION

PATENT NO. : 5,780,957
DATED : July 14, 1998
INVENTOR(S) : John R. Oliver, et al.

Page 2 of 2

It is certified that error appears in the above-identified patent and that said Letters Patent is hereby corrected as shown below:

OTHER DOCUMENTS

| | | |
|---|---|---|
| | | Search Report dated March 13, 1998 corresponding to PCT Application |
| | | No. PCT/US97/20147 with an international filing date of November 11, 1997. |
| | | |

Signed and Sealed this

Second Day of March, 1999

Attest:

Q. TODD DICKINSON

Attesting Officer

Acting Commissioner of Patents and Trademarks